United States Patent
Schubert et al.

(10) Patent No.: US 9,905,876 B2
(45) Date of Patent: Feb. 27, 2018

(54) REDOX FLOW CELL COMPRISING HIGH MOLECULAR WEIGHT COMPOUNDS AS REDOX PAIR AND SEMIPERMEABLE MEMBRANE FOR STORAGE OF ELECTRICAL ENERGY

(71) Applicant: JenaBatteries GmbH, Jena (DE)

(72) Inventors: Ulrich Sigmar Schubert, Jena (DE); Martin Hager, Jena (DE); Tobias Janoschka, Jena (DE)

(73) Assignee: JENABATTERIES GMBH, Jena (DE)

( * ) Notice: Subject to any disclaimer, the term of this patent is extended or adjusted under 35 U.S.C. 154(b) by 152 days.

(21) Appl. No.: 14/420,675

(22) PCT Filed: Jul. 25, 2013

(86) PCT No.: PCT/EP2013/002206
§ 371 (c)(1),
(2) Date: Feb. 10, 2015

(87) PCT Pub. No.: WO2014/026728
PCT Pub. Date: Feb. 20, 2014

(65) Prior Publication Data
US 2015/0207165 A1    Jul. 23, 2015

(30) Foreign Application Priority Data
Aug. 14, 2012   (DE) .................. 10 2012 016 317

(51) Int. Cl.
*H01M 8/20* (2006.01)
*H01M 8/18* (2006.01)
(Continued)

(52) U.S. Cl.
CPC ............ *H01M 8/20* (2013.01); *H01M 4/602* (2013.01); *H01M 8/0289* (2013.01);
(Continued)

(58) Field of Classification Search
CPC .......... H01M 8/18; H01M 8/188; H01M 8/20; H01M 8/02; H01M 8/0291; H01M 4/60; H01M 4/602
See application file for complete search history.

(56) References Cited

U.S. PATENT DOCUMENTS

| 5,681,357 A | 10/1997 | Eschbach et al. |
| 6,509,119 B1 | 1/2003 | Kobayashi et al. |

(Continued)

FOREIGN PATENT DOCUMENTS

| AU | 575247 B2 | 7/1988 |
| CN | 1224730 A | 8/1999 |

(Continued)

OTHER PUBLICATIONS

International Search Report dated Nov. 5, 2013.
(Continued)

*Primary Examiner* — Karie O'Neill Apicella
(74) *Attorney, Agent, or Firm* — Michael W. Ferrell; Ferrells, PLLC; Anna L. Kinney

(57) ABSTRACT

It was an object of the invention to provide, by use of new materials and membranes and with very little outlay, an inexpensive and long-lived redox flow cell which even in the event of a possible serious accident brings about little environmental pollution by its redox-active compounds.

According to the invention, high molecular weight compounds such as redox-active polymers or oligomers are provided as redox-active components and a size-exclusion membrane (3) is provided as membrane for the separation of the high molecular weight redox-active components.

18 Claims, 1 Drawing Sheet

(51) Int. Cl.
*H01M 8/02* (2016.01)
*H01M 4/60* (2006.01)
*H01M 8/0289* (2016.01)

(52) U.S. Cl.
CPC ........ *H01M 8/188* (2013.01); *H01M 2250/10* (2013.01); *H01M 2250/20* (2013.01); *Y02B 90/14* (2013.01); *Y02E 60/528* (2013.01); *Y02T 90/32* (2013.01)

(56) References Cited

U.S. PATENT DOCUMENTS

| | | | |
|---|---|---|---|
| 7,199,550 | B2 | 4/2007 | Tsutsui et al. |
| 8,080,327 | B1 | 12/2011 | Rasmussen |
| 8,541,138 | B2 | 9/2013 | Kazacos et al. |
| 8,795,565 | B2 | 8/2014 | Wei et al. |
| 2007/0151447 | A1 | 7/2007 | Merkel |
| 2007/0269710 | A1* | 11/2007 | Hirano ................ C07D 233/58 429/498 |
| 2011/0135967 | A1* | 6/2011 | Pellissier ................ H01M 8/16 429/2 |
| 2012/0077067 | A1 | 3/2012 | Li et al. |
| 2012/0171541 | A1 | 7/2012 | Park et al. |
| 2014/0323996 | A1 | 10/2014 | Langer et al. |

FOREIGN PATENT DOCUMENTS

| | | | | |
|---|---|---|---|---|
| CN | 1770503 | A | 5/2006 | |
| CN | 102005554 | A | 4/2011 | |
| CN | 102119461 | A | 7/2011 | |
| EP | 2650947 | A1 | 10/2013 | |
| JP | 10172600 | A | 6/1998 | |
| JP | 2000357520 | A | 12/2000 | |
| JP | 2001167788 | A | 6/2001 | |
| JP | 2002329522 | A | 11/2002 | |
| JP | 3729296 | B2 | 12/2005 | |
| JP | 2006147306 | A | 6/2006 | |
| JP | 2008544444 | A | 12/2008 | |
| JP | 2009527633 | A | 7/2009 | |
| JP | 2010086935 | A | 4/2010 | |
| JP | 2010111639 | A | 5/2010 | |
| JP | 2014503523 | A | 2/2014 | |
| WO | 2009151639 | A1 | 12/2009 | |
| WO | 2012075810 | A1 | 6/2012 | |
| WO | 2012080365 | A1 | 6/2012 | |
| WO | 2012083233 | A1 | 6/2012 | |
| WO | WO 2012083233 | A1 * | 6/2012 | .......... B60L 11/1879 |

OTHER PUBLICATIONS

Zhang et al., "Advanced Charged Membranes With Highly Symmetric Spongy Structures for Vanadium Flow Battery Application", Energy & Environmental Science, 2013, 776-781, Issue 3, vol. 6, The Royal Society of Chemistry.

Wei et al., Hydrophobic Asymmetric Ultrafiltration PVDF Membranes: An Alternative Separator for VFB with Excellent Stability, Physical Chemistry Chemical Physics, Feb. 14, 2013, pp. 1766-1771, vol. 15, Issue 6, The Royal Society of Chemistry.

Zhang et al., Nanofiltration (NF) Membranes: The Next Generation Separators for All Vanadium Redox Flow Batteries (VRBs)?, Energy Environ. Sci., 2011, pp. 1676-1679, vol. 4, Issue 5, The Royal Society of Chemistry.

Zhang et al., Silica Modified Nanofiltration Membranes With Improved Selectivity for Redox Flow Battery Application, Energy Environ. Sci. 2012, pp. 6299-6303, vol. 5, Issue 4, The Royal Society of Chemistry.

Weber et al., Redox Flow Batteries: A Review, J. Appl. Electrochem, Oct. 2011, pp. 1137-1164, vol. 41, Issue 10, Springer Netherlands.

Matsuda et al., A Rechargeable Redox Battery Utilizing Ruthenium Complexes With Non-Aqueous Organic Electrolyte, Journal of Applied Electrochemistry, 1988, pp. 909-914, vol. 18, Chapman and Hall Ltd.

International Preliminary Report on Patentability dated Feb. 26, 2015.

Japanese Examination Report dated May 9, 2017.

* cited by examiner

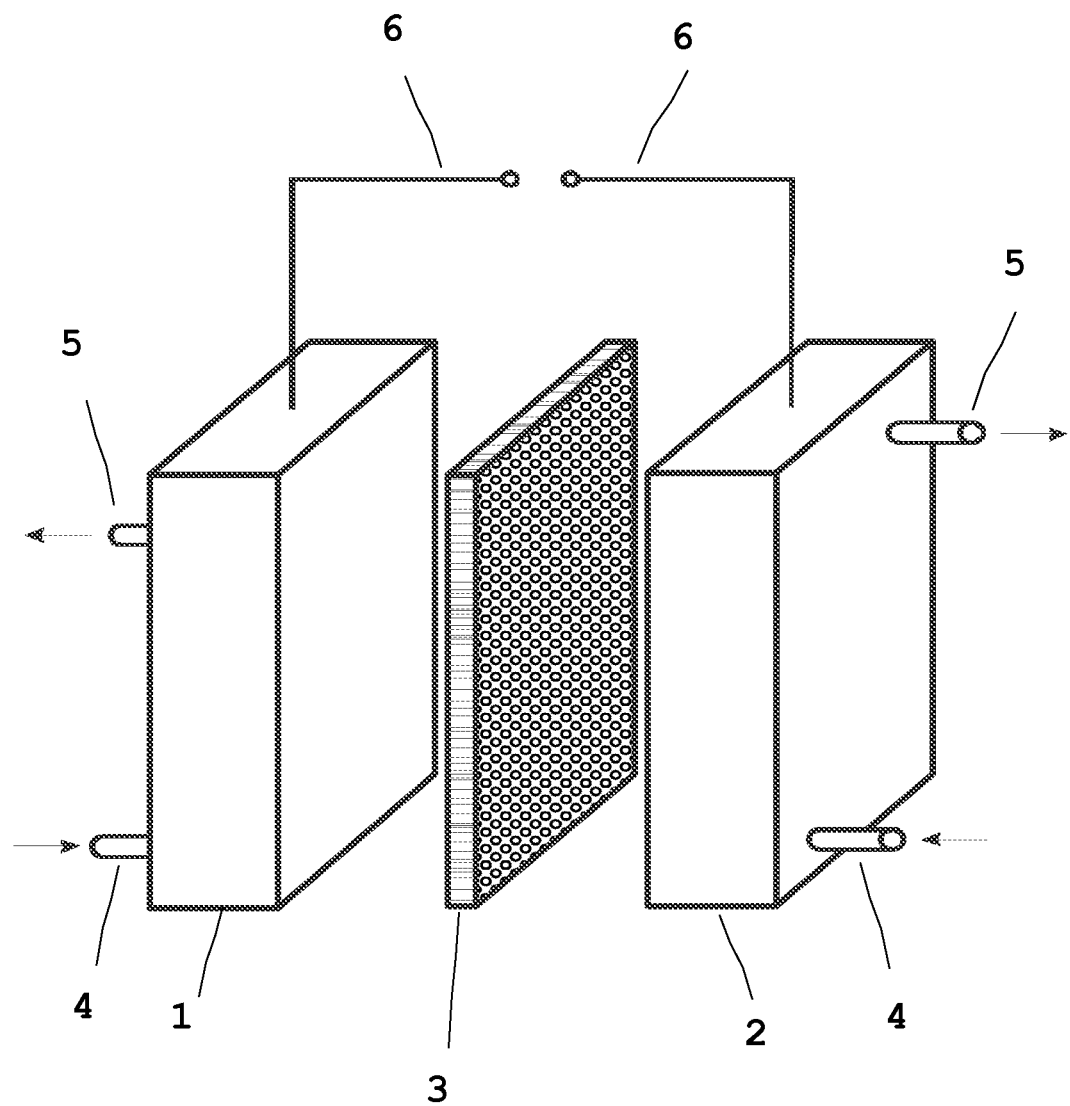

REDOX FLOW CELL COMPRISING HIGH MOLECULAR WEIGHT COMPOUNDS AS REDOX PAIR AND SEMIPERMEABLE MEMBRANE FOR STORAGE OF ELECTRICAL ENERGY

CLAIM FOR PRIORITY

This application is a national phase application of PCT/EP2013/002206 FILED Jul. 25, 2013 which was based on application DE 10 2012 016 317.7 FILED Aug. 14, 2012. The priorities of PCT/EP2013/002206 and DE 10 2012 016 317.7 are hereby claimed and their disclosures incorporated herein by reference.

TECHNICAL FIELD

The invention relates to a redox flow cell, in general, also referred to as a redox flow battery, for storage of electric energy. The redox flow cell contains two polarity-specific chambers in each of which a redox-active chemical compound is present in dissolved form or a redox-active compound is present in dissolved form in both chambers and is connected to a liquid store. In this way, two independent circuits for the redox-active compounds dissolve in, for example, water or an organic solvent, which are separated by a membrane between the polarity-specific chambers, are formed. Ion exchange between the two chambers occurs through this membrane.

The cells are particularly suitable for stationary storage applications, for example as buffer battery for wind power plants or as power and regulating reserves for low equalization in power grids, and also as mobile energy stores, for example for the operation of electric cars and electronic appliances.

BACKGROUND

Existing redox flow batteries (RFB) are electrochemical energy stores. The compounds required for establishing the potential at the electrodes are dissolved, redox-active species which are converted into their other redox state in an electrochemical reactor during the charging or discharging process. For this purpose, the electrolyte solutions (catholyte, anolyte) are taken from a tank and actively pumped to the electrodes. Anode space and cathode space are separated in the reactor by means of an ion-selective membrane which usually has a high selectivity for protons. As long as electrolyte solution is pumped, power can be taken off. The charging process is then simply the reverse of this process. The quantity of energy which can be stored in an RFB is therefore directly proportional to the size of the storage tank. The power which can be taken off, on the other hand, is a function of the size of the electrochemical reactor.

RFBs have a complex system technology (BoP—Balance of Plant) which corresponds approximately to that of a fuel cell. Customary construction sizes of the individual reactors are in the range from about 2 to 50 kW. The reactors can be combined very simply in a modular fashion, and the tank size can likewise be adapted virtually at will. RFBs which operate using vanadium compounds as redox pair on both sides (VRFB) are of particular importance here. This system was described for the first time in 1986 (AU 575247 B) and is at present the technical standard. Further inorganic, low molecular weight redox pairs have been studied, including ones based on cerium (B. Fang, S. Iwasa, Y. Wei, T. Arai, M. Kumagai: "A study of the Ce(III)/Ce(IV) redox couple for redox flow battery application", Electrochimica Acta 47, 2002, 3971-3976), ruthenium (M. H. Chakrabarti, E. Pelham, L. Roberts, C. Bae, M. Saleem: "Ruthenium based redox flow battery for solar energy storage", Energy Conv. Manag. 52, 2011, 2501-2508), chromium (C-H. Bae, E. P. L. Roberts, R. A. W. Dryfe: "Chromium redox couples for application to redox flow batteries", Electrochimica Acta 48, 2002, 279-87), uranium (T. Yamamura, Y. Shiokawa, H. Yamana, H. Moriyama: "Electrochemical investigation of uranium β-diketonates for all-uranium redox flow battery", Electrochimica Acta 48, 2002, 43-50), manganese (F. Xue, Y. Wang, W. Hong Wang, X. Wang: "Investigation on the electrode process of the Mn(II)/Mn(III) couple in redox flow battery", Electrochimica Acta 53, 2008, 6636-6642) and iron (Y. Xu, Y. Wen, J. Cheng, G. Cao, Y. Yang: "A study of iron in aqueous solutions for redox flow battery application", Electrochimica Acta 55, 2010, 715-720). However, these systems are based on metal-containing electrolytes which are toxic or damaging to the environment.

VRFB reactors can at present be obtained in blocks of from 1 to 20 kW. Higher power outputs are achieved by modular connection of these. Each individual block contains a plurality of planar cells which are connected in series to achieve a higher voltage. This bipolar construction largely corresponds to the construction of a PEM fuel cell. A perfluorinated polymer having sulfonic acid groups, usually DuPont Nafion® 117, is utilized as membrane. Other polymers have been described, for example polymers based on SPEEK (Q. Luo, H. Zhang, J. Chen, D. You, C. Sun, Y. Zhang: "Nafion/SPEEK composite: Preparation and characterization of Nafion/SPEEK layered composite membrane and its application in vanadium redox flow battery", J. Memb. Sci. 325, 2008, 553-558), PVDF (J. Qiu, J. Zhang, J. Chen, J. Peng, L. Xu, M. Zhai, J. Li, G. Wei: "Amphoteric ion exchange membrane synthesized by radiation-induced graft copolymerization of styrene and dimethylaminoethyl methacrylate into PVDF film for vanadium redox flow battery applications", J. Memb. Sci. 334, 2009, 9-15), QPPEK (S. Zhang, C. Yin, D. Xing, D. Yang, X. Jian: "Preparation of chloromethylated/quaternized poly (phthalazinone ether ketone) anion exchange membrane materials for vanadium redox flow battery applications", J. Memb. Sci. 363, 2010, 243-249), fluorine-free sulfonated polyarylene (D. Chen, S. Wang, M. Xiao, Y. Meng: "Synthesis and properties of novel sulfonated poly(arylene ether sulfone) ionomers for vanadium redox flow battery", Energy Conv. Manag. 51, 2010, 2816-2824) or inorganic-organic composite materials comprising $SiO_2$ (J. Xi, Z. Wu, X. Qiu, L. Chen: "Nafion/$SiO_2$ hybrid membrane for vanadium redox flow battery", J. Pow. Sour. 166, 2007, 531-536), but, in contrast to Nafion membranes, are not yet practical and commercially available. The same applies to nanofiltration membranes which allow the protons of the acid electrolyte to pass through and hold back the vanadium salts (Hongzhang Zhang, Huamin Zhang, Xianfeng Li, Zhensheng Mai, Jianlu Zhang: "Nanofiltration (NF) membranes: the next generation separators for all vanadium redox flow batteries (VRBs)", Energy & Environmental Science, 2011, 4, 1676-1679). Regardless of these, the same disadvantages such as high cost and environmental pollution in the case of a major accident and also short life of the cells would also apply here.

In the present state of the art, the use of ion-conducting membranes limits further commercialization since standard Nafion® membranes are expensive, fluorine-containing, mechanically weak; furthermore, these swell to a great degree and are susceptible to an electrochemical short circuit due to inward diffusion of vanadium ions.

Purely organic redox compounds have hitherto been used very little in RFBs. Thus low molecular weight 2,2,6,6-tetramethylpiperidinyloxy (TEMPO) and N-methylphthalimide have been used in an RFB having an ion-conducting membrane (Z. Li, S. Li, S. Q. Liu, K. L. Huang, D. Fang, F. C. Wang, S. Peng: "Electrochemical properties of an all-organic redox flow battery using 2,2,6,6-tetramethyl-1-piperidinyloxy and N-methylphthalimide", Electrochem. Solid State Lett. 14, 2011, A171-A173). Furthermore, rubrene is ruled out because of high costs and very low solubility, despite good electrochemical properties (cf. H. Charkrabarthi, R. A. W. Dryfe, E. P. L. Roberts, Jour. Chem. Soc. Pak. 2007, 29, 294-300 "Organic Electrolytes for Redox Flow Batteries").

Batteries based on 2,3,6-trimethylquinoxaline also utilize expensive ion-selective Nafion® membranes (F. R. Brushett, J. T. Vaughey, A. N. Jansen: "An All-Organic Non-aqueous Lithium-Ion Redox Flow Battery", Adv. Energy Mater. 2012, 2, 1390-1396).

Pyrazine-based cyanoazacarbones (U.S. Pat. No. 8,080,327 B1) have been used both as anolyte and as catholyte, with ion-conducting membranes based on cation exchangers and anion exchangers being used for separating the electrode spaces. These membranes are expensive and in each case permeable only to a particular class of ions. This is reflected, in particular, in a disadvantageous system construction which has to utilize an electrolyte reservoir between the anolyte circuit and the catholyte circuit. This is necessary in order to ensure charge equalization/mixing of the anions which diffuse through the anion exchanger membrane into the reservoir and the cations which diffuse through the cation exchanger membrane into the reservoir.

Apart from the organic redox compounds, low molecular weight metal-organic compounds are described (M. H. Chakrabartia, R. A. W. Dryfe, E. P. L. Roberts: "Evaluation of electrolytes for redox flow battery applications", Electrochimica Acta, 52, 2007, 2189-2195). Here, organic ligands which complex inorganic metal salts are used. Such ligands are, for example, bipyridyl, terpyridyl, phenanthroline or imidazoles (US 2012/0171541 A1). For these systems, too, expensive ion-conducting membranes such as Nafion® or amine-functionalized polystyrene derivatives have to be used. The same applies to redox flow batteries based on low molecular weight ruthenium-bipyridine complexes which, for example, utilize the anion exchanger membranes Neocepta®. Other membranes are, in contrast, permeable to these complexes and lead to a low efficiency of the battery in this case (Y. Matsuda, K. Tanaka, M. Okada, Y. Takasu, M. Morita, T. Matsumura-Inoue: "A rechargeable redox battery utilizing ruthenium complexes with non-aqueous organic electrolyte", J. Applied Electrochem. 18, 1988, 909-914).

It is an object of the invention to provide, by use of new materials and membranes and with very little outlay, an inexpensive and long-lived redox flow cell which even in the event of a possible serious accident brings about little environmental pollution by its redox-active compounds.

SUMMARY OF INVENTION

This object is achieved according to the invention by a redox flow cell for energy storage, containing a reaction cell having two polarity-specific chambers (1, 2) for catholyte and anolyte, which are each connected to a store for liquid and are separated by a membrane for ion exchange, where the chambers (1, 2) are each filled with redox-active components present undiluted, in dissolved form or dispersed in an electrolyte solvent and also conducting salts dissolved therein and possibly further additives, as a result of the fact that high molecular weight compounds are provided as redox-active components and a size-exclusion membrane (3) is provided as membrane for separating the high molecular weight redox-active components present undiluted, in dissolved form or in dispersed form.

Preference is given to redox flow cells in which the chambers (1, 2) are each filled with redox-active components which are present undiluted or as a solution in water or an organic solvent.

BRIEF DESCRIPTION OF DRAWING

The invention is described in detail below in connection with the drawing which is a redox flow cell depicted schematically as an exemplary embodiment.

DETAILED DESCRIPTION

For the purposes of the present description, the term "size-exclusion membrane" refers to a membrane which has at least the following features
separation of anode and cathode space
retention of the high molecular weight redox-active components
permeability for the conducting salts of the electrolyte which serve for charge equalization, i.e. for anions and cations of the conducting salt.

The retention principle of the membrane used according to the invention is based on the principle of size exclusion, i.e. the membrane distinguishes between redox-active components and ions of the conducting salt on the basis of their size, which can be described, for example, by the molar mass (number average), number of repeating units, ionic radius and/or inertial radius.

For the purposes of the present description, selectivity is the separation limit at which the molecules can no longer pass efficiently through the membrane. This means that at a given molecular weight of the molecule, at least 90% of the molecules are retained by the membrane.

The proposed size-exclusion membrane, for example a semipermeable membrane or a dialysis membrane, preferably separates these high molecular weight redox-active components in the two chambers with a selectivity of at least 500 g/mol, particularly preferably at least 550 g/mol, where redox-active organic or metal-organic materials, polymers or oligomers which accordingly have a molar mass greater than the selectivity of the size-exclusion membrane are used as high molecular weight components.

The size-exclusion membrane used according to the invention effects separation by means of a physical (mechanical) membrane separation process. Here, use is made of the principle of size exclusion, i.e. all particles in the polarity-specific chambers for catholyte and anolyte which are larger than the pores of the membrane are retained by the membrane.

The size-exclusion membrane used according to the invention can consist of a variety of materials as long as the abovementioned functionalities are ensured. The materials of the size-exclusion membrane can, depending on the particular application, consist of plastics, ceramics, glasses, metals or sheet-like textile structures. Examples of materials are organic polymers such as cellulose or modified cellulose, for example cellulose ethers or cellulose esters, polyether sulfone, polysulfone, polyvinylidene fluoride, polyesters, polyurethanes, polyamides, polypropylene, polyvinyl chloride, polyacrylonitrile, polystyrene, polyvinyl alcohol, polyphenylene oxide, polyimides, polytetrafluoroethylene and derivatives thereof, or else ceramics, glasses or felts. Size-exclusion membranes consisting of a plurality of materials (composites) are also possible.

The size-exclusion membranes can be used in various forms of the filler elements. Examples thereof are flat membranes, bag filters and hollow fiber modules. These embodiments are known to a person skilled in the art. Preference is given to using flat membranes.

The size-exclusion membrane used according to the invention can be supported to give better stability.

The thickness of the size-exclusion membrane used according to the invention can vary within a wide range. Typical thicknesses are in the range from 1 μm to 5 mm, particularly preferably from 10 μm to 200 μm.

The high molecular weight redox-active components used according to the invention can be any compounds which can be present in at least two different stable oxidation states and have a molecular weight such that they cannot pass through the size-exclusion membrane used according to the invention.

High molecular weight redox-active components can be polymers or oligomers; here, the term oligomers refers to compounds having a molar mass of from 500 to 5000 g/mol (number average) and the term polymers refers to compounds having a molar mass of greater than 5000 g/mol (number average).

Typical redox-active components used according to the invention are oligomers or polymers which have a polymer backbone containing one or more active units. These active units can be coupled to the polymer backbone in various ways. Covalent bonding of the active units to the polymer backbone can be present, i.e. the active units are covalently bound as side groups to the polymer backbone, for example via C—C bonds or via bridging groups such as —O—, —S—, —NH—, CO—, —CONH— or —COO—. However, the active units can also form a constituent of the polymer backbone and are then covalently incorporated into the polymer backbone, for example via C—C bonds or via bridging groups such as —O—, —S—, —NH—, CO—, —CONH— or —COO—. Finally, the active units can also be coordinated to the polymer backbone or bound to the polymer backbone via supramolecular interactions, for example via hydrogen bonds, ionic interactions, pi-pi interactions or as Lewis acid to groups having Lewis base properties which are in turn bound to the polymer backbone or as Lewis base to groups having Lewis acid properties which are in turn bound to the polymer backbone.

Examples of compounds which can form the polymer backbone are polymers derived from ethylenically unsaturated carboxylic acids or esters or amides thereof, e.g. polymethacrylates, polyacrylates or polyacrylamide, polymers derived from ethylenically unsaturated aryl compounds, e.g. polystyrene, polymers derived from vinyl esters of saturated carboxylic acids or derivatives thereof, e.g. polyvinyl acetate or polyvinyl alcohol, polymers derived from olefins or bicyclic or polycyclic olefins, e.g. polyethylene, polypropylene or polynorbornene, polyimides derived from imide-forming tetracarboxylic acids and diamines, polymers derived from natural occurring polymers and their chemically modified derivatives, e.g. cellulose or cellulose ethers, and also polyurethanes, polyvinyl ethers, polythiophenes, polyacetylene, polyalkylene glycols, poly-7-oxanorbornene, polysiloxanes, polyalkylene glycol and derivatives thereof, e.g. ethers thereof, preferably polyethylene glycol and derivatives thereof. Particularly preferred classes of materials used which form the polymer backbone are polymethacrylates, polyacrylates, polystyrene, polyalkylene glycols and polyvinyl ethers.

Examples of compounds which can form the active unit are compounds which form nitroxide radicals or 2,2-diphenyl-1-picrylhydrazyl radicals, Wurster salts, quinones, compounds which can form galvinoxyl radicals, phenoxyl radicals, triarylmethyl radicals, polychloro-triphenylmethyl radicals, phenalenyl radicals, cyclopentadienyl radicals, iminoxyl radicals, verdazyl radicals, nitronylnitroxide radicals or thiazyl radicals, indigo, disulfides, thiafulvalenes, thioethers, thiolanes, thiophenes, viologen, tetraketopiperazine, quinoxaline, triarylamine, calix[4]arene, anthraquinonyl sulfide, phthalazine, cinnoline, ferrocene, carbazole, polyindole, polypyrrol, polyaniline, polythiophene, poly-N,N'-diallyl-2,3,5,6-tetraketopiperazine, 2,5-di-tertbutyl-4-methoxyphenoxypropyl esters, poly-2-phenyl-1,3-dithiolane, poly[methanetetryltetrathiomethylene], poly-2,4-dithiopentanylene, polyethene-1,1,2,2-tetra-thiol, poly-3,4-ethylenedioxythiophene, 5,5-bismethylthio-2,2-bithiophene, poly-1,2,4,5-tetrakispropylthio-benzene, poly-5-amino-1,4-dihydrobenzo[d]-1'2'-dithiadiene-co-aniline, poly-5,8-dihydro-1H,4H-2,3,6,7-tetrathia-anthracene, polyanthra[1',9',8'-b,c,d,e][4',10',5'-b',c',d',e']bis[1,6,6a6a-SIV-trithia]pentalene, polyene oligosulfide, poly-1,2-bisthiophen-3-ylmethyldisulfane, poly-3-thienylmethyl disulfide-co-benzyl disulfide, polytetrathionaphthalene, polynaphtho[1,8-cd][1,2]-dithiol, poly-2,5-dimercapto-1,3,4-thiadiazole, polysulfide, polythiocyanogen, polyazulene, polyfluorene, polynaphthalene, polyanthracene, polyfuran, tetrathiafulvalene or polyoxyphenazine and isomers and derivatives thereof.

The active units are preferably covalently bound to the polymer backbone. However, polymer adducts can also be used.

Particular preference is given to using polymers containing groups which form nitroxide radicals, verdazyl radicals or nitronylnitroxide radicals, viologens or quinones as redox-active components.

Examples of groups which form nitroxide radicals are piperidines, in particular the 2,2,6,6-tetraalkyl-substituted derivatives and particularly preferably the 2,2,6,6-tetraalkyl-4-amino-substituted derivatives or the 2,2,6,6-tetraalkyl-4-hydroxy-substituted derivatives.

Examples of viologens are bipyridyl derivatives, in particular the 4,4'-bipyridyl derivatives which are, in particular, alkyl-substituted in the 4,4'-position. It can also be advantageous to use "extended" viologens; these are oligomers made up of arylene, alkylene, alkylene ether or thiophene units which are incorporated between the pyridine units and are covalently bound to the latter.

Examples of quinones are oxidation products of phenols, e.g. of hydroquinone, of anthraquinone or of 1,4-dihydroxynaphthalene. 1,4-Benzoquinone and 1,4-naphthoquinone are preferred.

Very particular preference is given to using polymers which have a polymer backbone selected from the group consisting of polymethacrylates, polyacrylates, polystyrenes, polyalkylene glycols and polyvinyl ethers and have redox-active components selected from the group consisting of groups which form nitroxide radicals, verdazyl radicals or nitronylnitroxide radicals, viologens and quinones covalently bound to this polymer backbone.

Examples of polymers having a polymethacrylate backbone or polyacrylate backbone bearing groups which form nitroxide radicals covalently bound thereto are polymethacrylates or polyacrylates bearing 2,2,6,6-tetraalkyl-substituted piperidines which are bound via a 4-oxygen atom to the carboxyl groups of the polymethacrylate or polyacrylate. A particularly preferred example of such a polymer is poly(2,2,6,6-tetramethylpiperidinyloxymethacrylate-co-poly(ethylene glycol) methyl ether methacrylate).

Examples of polymers having a polyalkylene glycol backbone bearing copolymerized viologen radicals are polyethylene glycols having copolymerized 4,4'-bipyridyl radicals which are bound via the pyridyl nitrogen atoms to carbon atoms of the ethylene glycol. A particularly preferred example of such a polymer is poly(4,4'-bipyridine-co-poly(ethylene glycol)).

The average molar mass (number average) of the high molecular weight redox-active component is typically at least 500 g/mol, preferably at least 550 g/mol, particularly preferably at least 1000 g/mol, and is particularly preferably from 1000 to 500 000 g/mol and in particular from 1000 to 50 000 g/mol.

The polymers containing redox-active components can be present as linear polymers or as branched polymers, for example as comb or star polymers, dendrimers, conductive polymers, cyclic polymers, polycatenanes or polyrotaxanes.

Preference is given to using branched polymers, in particular comb or star polymers, dendrimers, conductive polymers, cyclic polymers, polycatenanes or polyrotaxanes. These types are characterized by increased solubility and the viscosity of the solutions obtained is generally lower than in the case of corresponding linear polymers.

The viscosity of the electrolytes used according to the invention is typically in the range from 1 mPas to $10^6$ mPas, particularly preferably from $10^2$ to $10^4$ mPas (measured at 25° C. using a rotational viscometer, plate/plate).

The solubility of the polymers containing redox-active components which are used according to the invention can also be improved by copolymerization or functionalization, e.g. with polyethylene glycol, polymethacrylic acid, polyacrylic acid, poly-2-methyl-oxazolin or polystyrene sulfonate.

The polymers used according to the invention and comprising redox-active components can be prepared by the usual polymerization processes. Examples thereof are bulk polymerization, solution polymerization, precipitation polymerization or emulsion or suspension polymerization, and also polymer-analogous functionalizations. These procedures are known to a person skilled in the art.

The redox-active components can be used as such, i.e. without solvent, if they are liquid at the use temperature. However, the redox-active components are preferably used together with a solvent.

The redox flow cell of the invention can contain yet further elements or components which are customary for such cells in addition to the above-described components. Some of these components are necessary, while other components can be used if appropriate.

Examples of components which are necessarily present are electrodes such as electrodes made of graphite, graphite nonwoven, graphite paper, carbon nanotube carpets or graphene power outlet leads such as leads made of graphite or of metals electrolytes containing conducting salts dissolved therein; these can be liquid redox-active polymers or a solution, emulsion or suspension composed of redox-active polymers and electrolyte solvents examples of electrolyte solvents are water or organic solvents such as acetonitrile, organic carbonates, alcohols, dimethylformamide, dimethyl sulfoxide, dimethylacetamide, dichloromethane, nitromethane, tetrahydrofuran, preferably water, acetonitrile and organic carbonates examples of conducting electrolyte salts are salts containing anions selected from the group consisting of $PF_6$, $BF_4$, $SbF_6$, $AsF_6$, $ClO_4$, $CF_3SO_3$, $SO_2C_2F_5$, $C_4F_9SO_3$, $(CF_3SO_3)N_2$, OH, $SO_4$, F, Cl, Br and I and also cations selected from the group consisting of H, alkali metal cations and alkaline earth metal cations and substituted or unsubstituted ammonium cations transport means such as pumps and also tanks and pipes for the transport and storage of redox-active components.

Examples of components which are optionally present are electrolytes additionally containing electrolyte additives in addition to the conducting salts dissolved therein examples of electrolyte additives are surfactants, viscosity modifiers, pesticides, buffers, stabilizers, catalysts, conductive additives, antifreezes, heat stabilizers.

Said high molecular weight redox-active components present undiluted, in dissolved form or in dispersed form in the two chambers and the separation of the flow circuits thereof having the abovementioned selectivity have made it possible to create a redox flow cell which does not contain any costly and toxic or hazardous electrolytes which in the case of damage could escape and pollute the environment.

The separation membrane between the two separate flow circuits can also be produced and used with a comparatively small outlay. It advantageously consists of organic material and is advantageously configured as a polymer membrane.

Studies up to now on the redox flow cell of the invention, in particular experiments involving many repeated charging/discharging cycles, indicate a significantly increased life and lower production costs during their application compared to the systems described at the outset.

The redox flow cell of the invention can be used in a variety of fields. These can in the widest sense be the storage of electric energy for mobile and stationary applications. The invention also provides for the use of the redox flow cell for these purposes.

Examples of applications are uses in the field of electromobility, e.g. as energy store in land, air and water vehicles, uses as stationary energy store for emergency power supply, peak load equalization and for the temporary storage of electric energy from renewable energy sources, in particular in the sector of photovoltaics and wind power.

The redox flow cell of the invention is preferably used as stationary store for electric energy.

The redox flow cells of the invention can be connected to one another in series or in parallel in a manner known per se.

The invention will be illustrated in more detail below with the aid of a redox flow cell depicted schematically in the drawing as exemplary embodiment.

The redox flow cell consists of two structurally identical half cells (1) and (2) produced as hollow Teflon bodies, where the half cell (1) acts as anolyte chamber and the half cell (2) acts as catholyte chamber.

The two half cells (1, 2) (shown in exploded view for reasons of clarity) are joined here via a size-exclusion membrane (3) having an exclusion limit of 1000 g/mol.

Each half cell (1, 2) has an inflow port (4) and an outflow port (5) via which the half cells (1, 2) are each joined by means of hoses to a respective storage vessel (store for liquid) containing the anolyte or catholyte for the corresponding half cell (1) or (2) (not shown in the drawing for reasons of clarity).

The anolyte or catholyte is (in each case as separate liquid circuit through the half cells (1) and (2) of the redox flow cell) pumped by means of a pump (likewise not shown for reasons of clarity) from the respective storage vessel through the appropriate half cell (1) or (2) (indicated by arrows at the inflow and outflow ports (4, 5)) during the charging/discharging process.

Each half cell (1, 2) has an internal electrode made of graphite/graphite felt at which an electrode reaction known per se takes place in the respective half cell (1, 2). These internal electrodes are in each case conducted as polarity-dependent power outlet lead (6) for electrical connection out from the half cells (1, 2).

A solution (10 mg/ml) of poly(2,2,6,6-tetramethylpiperidinyloxymethacrylate-co-poly(ethylene glycol) methyl ether methacrylate) in propylene carbonate is utilized as catholyte. A solution (10 mg/ml) of poly(4,4'-bipyridine-co-poly(ethylene glycol)) in propylene carbonate is used as anolyte. Tetrabutylammonium hexafluorophosphate (0.1 mol/l) is added as conducting salt to both solutions. The cell obtained in this way could be repeatedly charged and discharged at a constant current of 500 μA and had a discharge voltage of about 1.1 V.

LIST OF REFERENCE NUMERALS USED 1, 2—Half cell
3—Size-exclusion membrane
4—Inflow port
5—Outflow port
6—Power outlet lead

The invention claimed is:

1. A redox flow cell for storage of electric energy, containing a reaction cell having two polarity-specific chambers (1, 2) for catholyte and anolyte, which are each connected to a store for liquid and are separated by a membrane for ion exchange, where the chambers (1, 2) are each filled with redox-active components present undiluted, in dissolved form or dispersed in an electrolyte solvent and also conducting salts dissolved therein and optionally further additives, characterized in that high molecular weight compounds are provided as redox-active components and a size-exclusion membrane (3) is provided as membrane for separating the high molecular weight redox-active components present undiluted, in dissolved form or in dispersed form, wherein the high molecular weight redox-active components comprise polymers containing groups which form nitroxide radicals, verdazyl radicals or nitronylnitroxide radicals, viologens or quinones.

2. The redox flow cell as claimed in claim 1, characterized in that the chambers (1, 2) are each filled with redox-active components which are present undiluted or as a solution in water or an organic solvent.

3. The redox flow cell as claimed in claim 1, characterized in that a semipermeable membrane is provided as size-exclusion membrane.

4. The redox flow cell as claimed in claim 1, characterized in that a dialysis membrane is provided as size-exclusion membrane.

5. The redox flow cell as claimed in claim 1, characterized in that the size-exclusion membrane has a selectivity of at least 500 g/mol and the high molecular weight redox-active components have a corresponding molar mass of greater than 500 g/mol.

6. The redox flow cell as claimed in claim 1, characterized in that the size-exclusion membrane consists of plastics, ceramics, glasses, metals, composites or sheet-like textile structures or combinations thereof.

7. The redox flow cell as claimed in claim 1, characterized in that the size-exclusion membrane consists of organic material and is, in particular, configured as polymer membrane.

8. The redox flow cell as claimed in claim 1, characterized in that the thickness of the size-exclusion membrane is in the range from 1 μm to 5 mm.

9. The redox flow cell as claimed in claim 1, characterized in that the high molecular weight redox-active component polymers have a polymer backbone selected from the group consisting of polymethacrylates, polyacrylates, polystyrenes, polyalkylene glycols and polyvinyl ethers and have redox-active components selected from the group consisting of groups which form nitroxide radicals, verdazyl radicals or nitronylnitroxide radicals, viologens and quinones covalently bound to the polymer backbone.

10. The redox flow cell as claimed in claim 1, characterized in that the redox-active component polymers are present as linear polymers or as branched polymers.

11. The redox flow cell as claimed in claim 1, characterized in that the viscosity of the electrolytes used is in the range from 1 mPas to $10^6$ mPas, measured at 25° C. using a rotational viscometer, plate/plate.

12. A method for the storage of electric energy for mobile and stationary applications comprising utilizing a redox flow cell as claimed in claim 1.

13. The method as claimed in claim 12, characterized in that the redox flow cell is utilized in the field of electromobility, as electrical energy storage in land, air and water vehicles, or in that the redox flow cell is utilized as stationary electrical energy storage for emergency power supply, peak load equalization and for the temporary storage of electric energy from renewable energy sources, in particular in the sector of photovoltaics and wind power.

14. The redox flow cell as claimed in claim 5, characterized in that the size-exclusion membrane has a selectivity of at least 500 g/mol and the high molecular weight redox-active components have a corresponding molar mass of greater than or equal to 550 g/mol.

15. The redox flow cell as claimed in claim 6, characterized in that the size-exclusion membrane consists of organic polymers selected from cellulose or modified cellulose, polyether sulfone, polysulfone, polyvinylidene fluoride, polyesters, polyurethanes, polyamides, polypropylene, polyvinyl chloride, polyacrylonitrile, dextran, lignin, polypropylene oxide, polyethylenimine, polyacrylic acid, polystyrene, polyvinyl alcohol, polyphenylene oxide, polyimides, polytetrafluoroethylene or derivatives thereof.

16. The redox flow cell as claimed in claim 8, characterized in that the thickness of the size-exclusion membrane is in the range from 10 μm to 200 μm.

17. The redox flow cell as claimed in claim 10, characterized in that the redox-active component polymers which are present as linear polymers or as branched polymers are selected from the group consisting of comb or star polymers, dendrimers, conductive polymers, cyclic polymers, polycatenanes and polyrotaxanes.

18. The redox flow cell as claimed in claim 1, characterized in that the viscosity of the electrolytes used is in the range from $10^2$ to $10^4$ mPas, measured at 25° C. using a rotational viscometer, plate/plate.

* * * * *